Dec. 25, 1923.  1,478,490
E. SPRAGUE, JR
CONFECTION MAKING MACHINE
Filed Dec. 14, 1922  2 Sheets-Sheet 1
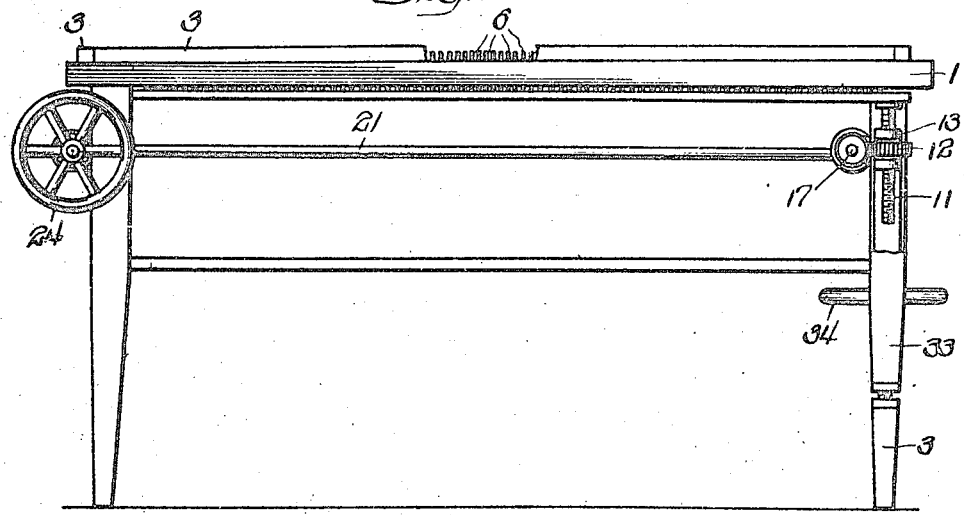
Fig. 1.
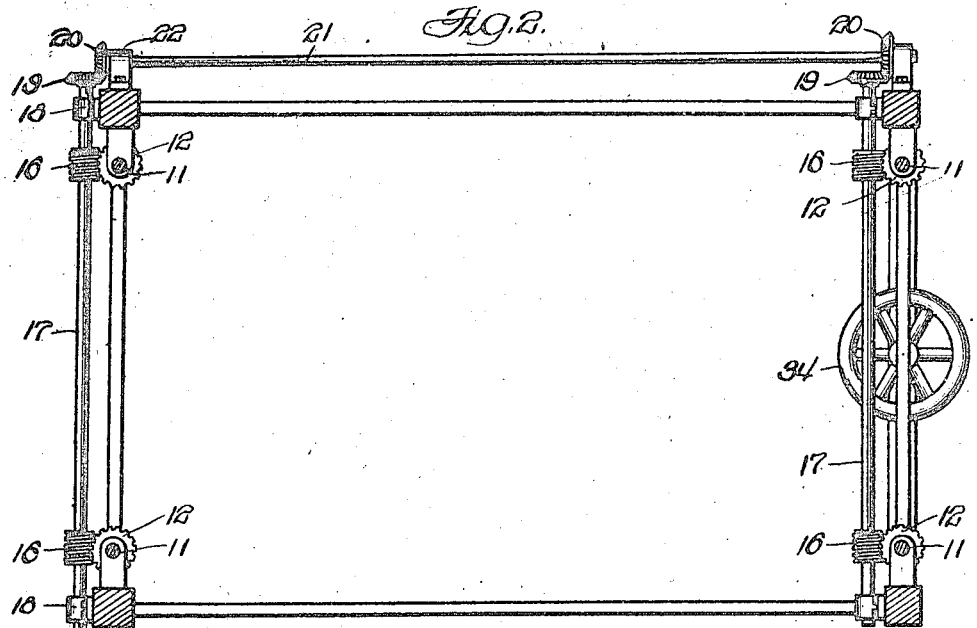
Fig. 2.
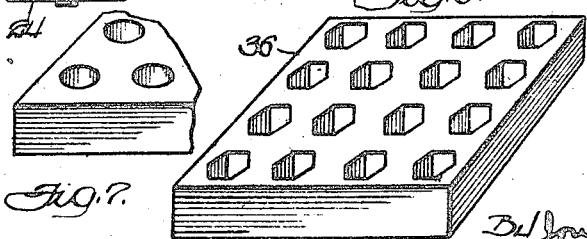
Fig. 6.
Fig. 7.
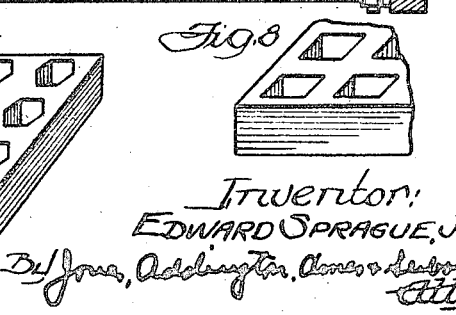
Fig. 8.
Inventor:
EDWARD SPRAGUE, JR.

Dec. 25, 1923.
E. SPRAGUE, JR
1,478,490
CONFECTION MAKING MACHINE
Filed Dec. 14, 1922    2 Sheets-Sheet 2
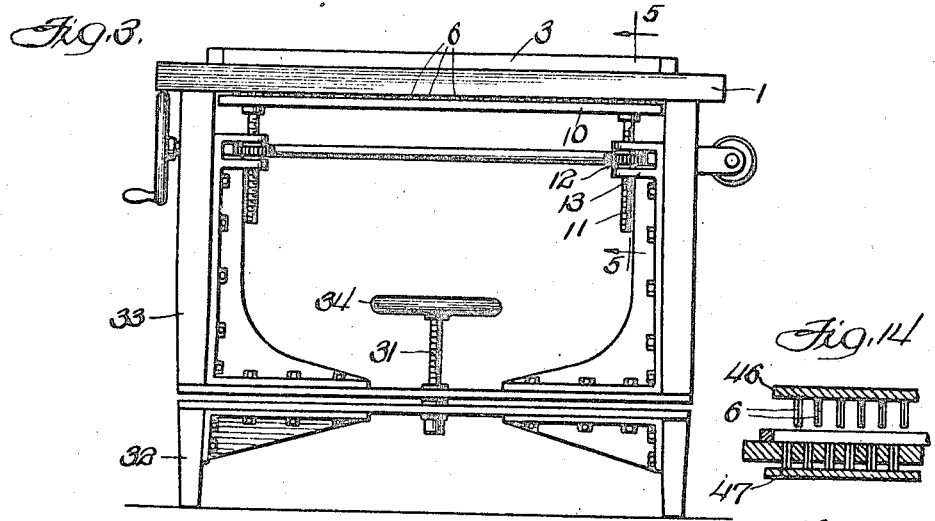
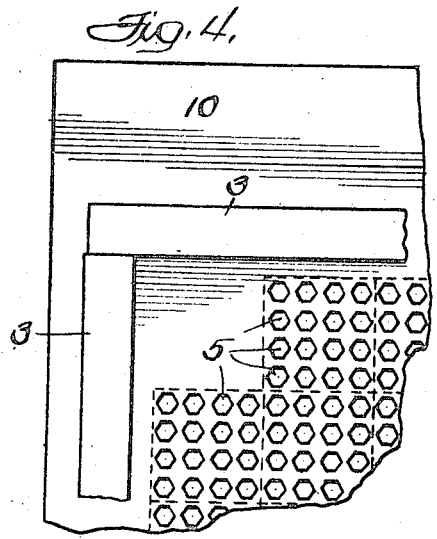
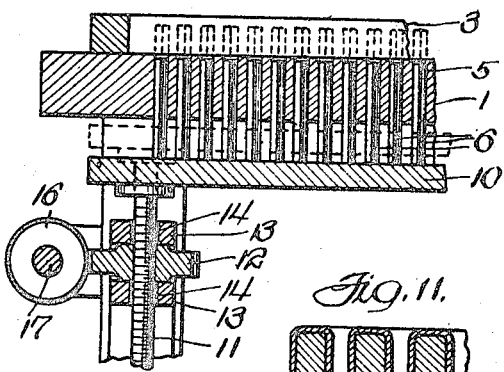
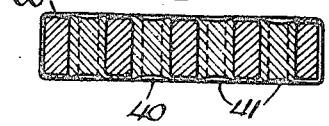
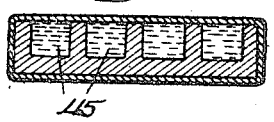
Inventor:
EDWARD SPRAGUE JR Patented Dec. 25, 1923.

1,478,490

UNITED STATES PATENT OFFICE.

EDWARD SPRAGUE, JR., OF CHICAGO, ILLINOIS, ASSIGNOR TO THE KUEHL CANDY CO., OF DAVENPORT, IOWA, A CORPORATION OF IOWA.

CONFECTION-MAKING MACHINE.

Application filed December 14, 1922. Serial No. 606,815.

*To all whom it may concern:*

Be it known that I, EDWARD SPRAGUE, Jr., a citizen of the United States, residing at Chicago, in the county of Cook and State of Illinois, have invented new and useful Improvements in Confection-Making Machines, of which the following is a full, clear, concise, and exact description, reference being had to the accompanying drawings, forming a part of this specification.

My invention relates to the art of making confectionery, and is concerned more particularly with an improved process and apparatus for forming confection cellular in shape, or other like configuration.

Briefly, my invention refers to confection of the type having a base, or outer shell, within which a filling is adapted to be placed, and then, if desired, a coating formed thereover, either as a protective for the base, or to hold the filling therein, or as both.

In making confectionery, especially of the above type, the outer shell is formed by dipping the filling, and in the case of a liquid cordial the shell is first formed and then punctured to receive the filling. Heretofore in the art considerable difficulty has been experienced in preserving fresh fruit in this filling. Many attempts have been made to treat the fruit before inserted in the confection. At best, icing was used to preserve the fruit for a short time, and usually not long enough to permit the confectioner to dispose of the goods before a change in the condition of the fruit was noticeable. In attempting to retain this condition by the use of icing, it was found that the outer coating of the confection soon became impaired, as the icing would liquefy in a short time. The fruit would then spoil. Furthermore, such a provision as this has in no way aided in keeping the berry, or fruit used, in original form. It has been a considerable problem to retain the form of the berry where it has first been cooked. Usually, in such a case, it is customary to intermingle the fruit with the other ingredients of the filling while cooking. When placed in the shell of the confection, the outline of the berry was seldom distinguishable.

Primarily, the object of my invention is to obviate the above difficulties, and includes the provision of an improved method of and means for making a confection capable of maintaining fruit, as a filling, intact in its fresh and original form, or providing a suitable base which may be finished in a way suitable for any particular purpose. A further object is to provide a novel manner of forming the confection, so that a cellular or honey-comb-like structure will result. Another object is the provision of a novel, simple and improved machine for carrying out the above, and a still further object is to provide an improved process, which consists in arranging the base of the confection, in liquid state, upon a mould and then withdrawing from the mould certain projecting elements, after the base has solidified, to form the cellular structure. The following advantages are the result of my invention:

(A) A honey-comb structure, uniform throughout, and consequently a more saleable appearance;

(B) Ability to finish the base in numerous ways;

(C) Preservation of fresh fruit for a longer time;

(D) Ability to use liquids or solids interchangeably as a filling; and (E) Increased efficiency of the base forming process, in that a labor-saving is effected and a maximum production had.

In order to apprise those skilled in the art how to construct and practise my invention, I shall now describe an embodiment thereof, taken in connection with the accompanying drawings which form a part thereof.

In the drawings:

Figure 1 is a side elevational view of a machine embodying my invention, part of the mould being broken away to show the aforesaid projecting elements;

Fig. 2 is a top plan view taken through the machine directly below the table;

Fig. 3 is an end view of the machine;

Fig. 4 is an enlarged fragmentary detail view of the slab, and the members forming the sides of the mould;

Fig. 5 is a section taken through part of the mechanism which controls the position of said projecting elements;

Fig. 6 is a perspective view of a confection having polygonal cells or pockets therein;

Fig. 7 is a fragmentary view of a confection having circular cells;

Fig. 8 is a similar view of a confection having square cells;

Fig. 9 is a cross sectional view of a confection filled with fruit;

Fig. 10 is a similar view illustrating a coating of chocolate or like material filling these cells;

Fig. 11 is also a similar view illustrating the same coating covering the walls of the cells;

Figure 12 is also a similar view illustrating an ice cream base filled with suitable material and a coating applied thereover;

Fig. 13 illustrates the use of liquid as a filling;

Fig. 14 is a fragmentary detail view of a slab provided with cell forming elements advancing from the upper and lower sides thereof; and, Fig. 15 is a fragmentary sectional view of a confection made thereby.

I have considered it conducive to a clear understanding of my invention, and particularly the article produced thereby and the extensive use thereof, to illustrate a machine constituting the preferred embodiment and to show several of the many forms of confection capable of being produced by this machine.

To form the base of the confection, which has been illustrated in Figs. 6 to 8 inclusive, so that it may be treated in the finishing stage to result in a confection, having fresh fruit, liquid cordial, or chocolate therein, or to result in honey-comb candy provided with a coating of butter scotch, or the like, to enhance the realistic appearance thereof, a forming slab 1 is utilized.

As shown in detail in Figs. 4 and 5, the slab is of considerable thickness, and upon the upper surface thereof, removable strips 3 are provided for serving as an enclosure for the liquid base as it is poured upon the table or slab. The slab 1 is provided with a plurality of openings 5, in this case being preferably perpendicular although not essential; and in these openings 5 move pins 6 suitably mounted, as will be presently explained, to move as a unit. Normally the pins 6 lie slightly below the surface of the slab 1. When the liquid base is poured upon the slab, these pins are moved to project a predetermined distance above the surface of slab. The liquid will flow about the pins, and if the latter have been projected only a limited distance, they will be covered by the liquid, whereupon when the base is hardened and removed from the slab, wells or pockets of limited depth will appear. It is merely a matter of preference in finishing the base whether the confection will be provided with cells which open at each end, or whether these cells will be limited in depth, with one end closed.

The pins 6 are finished so that they will fill the openings 5 to provide a substantially solid base when the upper ends of the pins are moved to lie flush with the upper surface of the slab. Thus the slab may be used in making candy devoid of cells or pockets. I desire to point out that the candy or base material may be poured upon the slab before the pins 6 are projected, this having been found advantageous in many instances, inasmuch as considerable time is saved in the moulding process by bringing the pins into the material after spread upon the slab. The close fit of the pins 6 in the openings 5 facilitates the withdrawal of the former from the candy after it has become partially solidified. It serves to clean each pin as it continues to recede in its opening and thereby prevents any tendency there may be for the material to cling to the pin.

The pins 6 are withdrawn from the base only after it has hardened to such a degree that its shape or form will not be destroyed. That is, the base is not disturbed until it has solidified and there is no possibility of the contour of these wells or pockets being lost after the pins 6 are removed. As will be hereinafter pointed out, the pins 6 in being removed from the base, will cause the upper edge of each well to become slightly rounded and thereby impart to the product the appearance of a honey-comb, which, in some instances, is particularly desirable.

Referring more particularly now to the structural details of the machine, the openings 5 in which pins 6 move have been shown in Fig. 4 as polygonal in contour to resemble more clearly a honey-comb structure. It is to be noted that these openings may be of any contour, such for instance as circular, as shown in Fig. 7 illustrating a portion of a confection made in accordance with my invention, or they may be square in contour, as shown in Fig. 8, which likewise illustrates a portion of a confection produced by the present machine.

Pins 6 are suitably anchored, or secured, to a carriage plate 10 adapted to have translational movement upon the machine. The mechanism for imparting this translational movement, comprises, in the present instance, a plurality of feed screws 11, each having a worm gear 12 thereon. It is to be noted, in Fig. 5, that these worm gears are carried in threaded relation upon the feed screws 11 and disposed in the bifurcated portion of the bearings 13. The feed screws 11 ride in aligned vertical openings 14 in the bearings 13. This particular arrangement results in the worm gears 12 being suitably held in a stationary position in order to mesh with worms 16, rigidly carried upon horizontal shafts 17, journaled in bearing 18, which are mounted upon the frame of the machine. One end of each shaft 17 is provided with a bevel gear 19 meshing with corresponding bevel gears 20 carried, in non-rotatable relation, on an interconnecting horizontal shaft 21, as shown in Fig. 2. The shaft 21 is also carried upon the frame of the machine by bearings 22.

In order to control the advancing movement of the pins 6 above the table accurately, a manually operated element has been provided. This comprises a hand wheel 24 mounted at the free end of one of the horizontal shafts 17. Whenever this wheel 24 is operated, the shafts 17 rotate in unison, through the interconnecting shaft 21, either to raise or to lower the feed screws 11, and in turn the carriage plate 10. Thus the pins 6 are moved vertically, and may be advanced beyond the surface of the slab during the moulding of the base material thereon, and then withdrawn just prior to the point in the solidification where the material becomes permanently set. It is to be noted that by removing the pins at this particular time from the base material on the slab 1, rounded edges, as indicated at 30 in Fig. 11, are formed about the cells or pockets, and consequently the honey-comb appearance is made more pronounced. However, this particular feature is not essential to the essence of my invention, and hence, the pins may be removed at any time in the formation of the base of the confection.

The liquid base in being poured, should be evenly spread over the entire slab, and in order to assist this action, provision has been made to tilt the frame of the machine at one end. To accomplish this, the frame at the front end is divided near the foot thereof. A feed screw 31 connects the base portion 32, resting on the floor, with the upper portion 33, carrying the slab 1. A handle 34 secured to the screw 31 may be manipulated in either direction to raise or lower the front end of the machine. As viewed in Fig. 1, the rear end of the machine serves as a pivot, permitting the upper or table portion to incline slightly, whereby the liquid base is caused to flow to all portions and be evenly spread.

As illustrated in Figs. 7 to 15 inclusive, the confection 35 is finished in various ways. I wish it to be understood that I do not intend to be limited in this respect, as it is possible to embody the base as it leaves the slab 1, in solid form, in a variety of forms of confectionery. The blank base 36 in its unfilled condition has been shown in Figs. 6 to 8 inclusive. As before explained, the various methods of shaping the cells or pockets have been illustrated therein. I have found that base direct from the fire will have a greater freedom of action in flowing about the pins 6 when formed polygonal than when formed circular or square. A further advantage of the polygonal formation lies in the fact that the removal of the pin from the base is greatly facilitated, due to the ability of its six knife-like edges to cut the same, as the pin is moved therethrough.

I intend to form the base 36 out of a variety of materials, such as candy, chocolate, ice cream, marshmallow, farina, and the like.

As shown in Fig. 9, the base 36 may consist of candy with fresh or preserved fruit 37 in the pockets 38. A coating of chocolate 39, or the like, is applied to the exterior of the article in order to seal the fruit 37 within the pockets 38, and to increase in general the novelty of the confection by having a coating of material of a different taste for flavoring the base 36. It will be noted that the pockets 38 are limited in depth, which is preferable in cases where fruit is used, such as in this form of confection.

In Figs. 10 and 11, the base 36 may also consist of candy and dipped in chocolate or other suitable material. In Fig. 10, the chocolate is permitted to have a greater viscosity, so that it will remain in the pockets 40 and form a suitable filling therefor. While the pockets 40 have been shown continuous, they may be formed only a portion of the way through the base 36. Particular notice should be given to the honey-comb effect the chocolate lends to the base as the former sets. The cohesive action of the chocolate causes button-like depressions to form on both surfaces, as indicated at 41. These tend to enhance the saleable appearance of the article, which is to represent preferably a honey-comb confection. If a perforated confection coated with chocolate is more desirable, the coating can be of chocolate having greater fluidity, so that the above mentioned cohesive action will be destroyed as the base is removed from the dipping kettle. This has been shown in Fig. 11.

Ice cream may be used as the base 36 and a coating of chocolate 42 applied thereto as a protective, and also to lend a different flavor to the ice cream. A noted advantage is obtained by providing the base of ice cream. Heretofore, it has been customary to market ice cream bars or sandwiches in containers continuous from end to end, that is, the container merely consisted of four walls within which a slice of ice cream was placed. When bitten into, the ice cream would, of course, melt and cause much inconvenience before entirely eaten. By the use of an aggregate of thinly connected walls, separated at points by chocolate, or like material, the ice cream is bonded together and is not permitted to flow freely while being eaten.

The use of liquid cordials in confection has met with considerable success. By employing the type of base shown in Fig. 9, the base can be conveniently dipped and the wells 45 filled with cordials, which wells can thereafter be sealed by a suitable coating, such as chocolate, this form being illustrated in Fig. 13.

In Fig. 14, I have diagrammatically illustrated the machine provided with an upper and a lower carriage plate 46 and 47, respectively, for carrying the pins 6, so that pockets might be formed on both sides of the base, as shown in Fig. 15. This base may be finished in any one of the ways above described.

After the base material has solidified sufficiently, it may be cut into squares of any desired size, as shown in Fig. 4.

From the foregoing it will be apparent that I have provided for attaining the objects of my invention and obviating the difficulties of the prior art in a simple, reliable and effective manner. I do not intend to be limited to the specific disclosures, or precise utilities specified, but aim to cover all modifications and adaptations coming within the scope of my invention as set out in the appended claims. The particular manner of forming the pockets or wells in the base in order to obtain a cellular structure, resembling a bee's honey-comb, and the method of advancing these pins may be varied. Likewise, a great variety of differently finished confections may be had of the base I have disclosed herein.

I claim:

1. In combination, a slab upon which confection in liquid form is adapted to be poured, means for moulding the confection in cellular-like formation, said means adapted to be projected into the confection.

2. In combination, a slab upon which confection in liquid form is adapted to be poured, means for imparting a cellular-like appearance to the confection, said means comprising a plurality of projections protruding from said slab.

3. In combination, a slab upon which confection in liquid form is adapted to be poured, means for imparting a cellular-like appearance to the confection, and means for controlling the position of said means whereby the depths of the cells formed may be varied.

4. In combination, a slab upon which confection in liquid form is adapted to be poured, cell forming members movable to lie in said confection while setting, and means for withdrawing said cell forming members prior to the complete hardening of the confection in order to round the edges about the cells resulting from the withdrawal of said members.

5. In combination, a slab upon which confection in liquid form is adapted to be poured, said slab being provided with apertures therein, and cell forming members guided in said apertures and having translational movement for projection beyond the surface of said slab.

6. In combination, a slab upon which confection in liquid form is adapted to be poured, said slab being provided with apertures therein, cell forming members guided in said apertures and having translational movement for projection beyond the surface of said slab, and a carriage for carrying said members.

7. In combination, a slab upon which confection in liquid form is adapted to be poured, movable cell forming members above the surface of said slab, and means for tilting said table to assist the flow of the liquid confection about said members.

8. In combination, a slab upon which confection in liquid form is adapted to be poured, a frame for carrying said slab, part of said frame being tiltable for inclining said slab.

9. In combination, a slab upon which confection in liquid form is adapted to be poured, a frame for carrying said slab, and frame tilting means for inclining said slab, said means being disposed at one end of said frame.

10. In combination, a slab upon which confection is adapted to be placed, a tiltable frame for carrying said slab, said frame having front and rear portions, and means on the lower part of said front portion for tilting the rest of said frame.

11. In combination, a slab upon which confection is adapted to be placed, a frame for said slab, said frame comprising front and rear portions, said front portion having its base divided from the upper part with a feed screw controlling the distance between the same whereby said slab may be inclined as desired.

12. In combination, a slab upon which confection is adapted to be placed, a tiltable frame for said slab, feed screw means for tilting said frame, cell forming means on said frame for projecting above the surface of said slab, and means for controlling the movement of said cell forming means, said means comprising a carriage movable by a manually operable feed screw mechanism.

13. The method of forming confection which comprises, pouring confection in liquid form upon a surface, then projecting elements a certain distance above said surface while the confection is still in a molten viscous condition, and then withdrawing these projecting elements after the confection solidifies so that pockets or cells are formed therein.

14. The method of forming confection which comprises, pouring confection in liquid form upon a surface, then projecting cell or pocket forming elements above said surface while the confection is still in a molten or viscous condition, and then as the confection is about to solidify withdraw said cell or pocket forming elements to round the peripheral edges about the cells or pockets thus formed.

15. The method of forming confection which comprises, pouring confection in a molten or viscous condition upon a surface, then projecting a plurality of cell or pocket forming elements in the confection, and in order to cause the same to flow freely about said elements, tilting the surface at the required angle.

In witness whereof, I have hereunto subscribed my name.

EDWARD SPRAGUE, Jr.